United States Patent [19]
Ede

[11] 3,942,722
[45] Mar. 9, 1976

[54] GROUND TREATMENT APPARATUS

[76] Inventor: Ainsley Neville Ede, 36 Thornton Way, Cambridge, England

[22] Filed: Mar. 28, 1975

[21] Appl. No.: 562,909

Related U.S. Application Data

[63] Continuation of Ser. No. 374,972, June 29, 1973, abandoned.

[52] U.S. Cl. ............... 239/102; 239/167; 239/180; 239/183; 239/189; 239/199; 47/1.7; 172/26
[51] Int. Cl.² ..................... B05B 3/14; B05B 3/18
[58] Field of Search ............ 239/102, 146, 155–162, 239/166–168, 173, 178–181, 183, 189, 197–199; 172/2, 26; 47/1.7

[56] References Cited
UNITED STATES PATENTS

| | | | |
|---|---|---|---|
| 3,285,516 | 11/1966 | Waldrum | 239/102 |
| 3,548,966 | 12/1970 | Blacket | 172/26 X |
| 3,770,202 | 11/1973 | Ivemy et al. | 239/183 |

FOREIGN PATENTS OR APPLICATIONS

| | | | |
|---|---|---|---|
| 557,068 | 11/1943 | United Kingdom | 239/167 |
| 886,277 | 1/1962 | United Kingdom | 239/159 |

*Primary Examiner*—Robert S. Ward, Jr.
*Attorney, Agent, or Firm*—Cushman, Darby & Cushman

[57] ABSTRACT

Irrigation apparatus comprises a movable vehicle arranged to be steered along a required ground path and carrying a pair of laterally-extending booms each of which is pivoted to one side of a rotatable turret mounted on the vehicle chassis. Each boom carries spray or sprinkler nozzles spaced along their lengths and one or more spray nozzles at its tip, all connected to a supply of water, and the spray patterns of the various nozzles overlap one another in such a way as to ensure even total dosage of water delivered per unit area of ground as the machine advances. Means is provided for angularly reciprocating the turret and booms about the vertical axis of the turret. The vehicle may be connected by a trailing flexible hose pipe to a hydrant, or may have a power-driven hose reel on which the hose is wound and by which it can can be reeled in or unreeled whilst the vehicle is moving and with the hose either empty or delivering water. The flexible hose may also be of a longitudinally-seamed construction. The vehicle may alternatively run along a water-filled canal and pick up water from the canal as it moves.

10 Claims, 35 Drawing Figures

GROUND TREATMENT APPARATUS

This is a continuation of application Ser. No. 374,972, filed June 29, 1973, and now abandoned.

This invention relates to apparatus for treating land and crops by distributing liquid or powder material thereon, for example for irrigation purposes.

The general problem with above ground sprinkler systems for irrigation is that there is a normal limit of about 20 meters on the length of throw of a sprinkler water jet, which leads to a very close spaced system or grid of sprinkler heads. But the application of water from these points can be completed in the matter of about 4 hours, an operation which does not need repeating for a week or 2 weeks. A permanent system of pipes feeding each sprinkler point is greatly under-utilised as a result and is normally uneconomic, whereas a system temporarily set up for 4 hours requires to be moved at the end of this period, and the cost of this operation and the labour required for it constitute problems and the task is often unwelcome for this reason. There has been various proposals for enabling the lines of pipes to be progressively moved forward, for instance by forming them into a line rotating on wheels about a fixed central axis which is also the pipe, or by having the line moving forward by a means of a series of wheels and carriages kept in line on a parallel basis by a control system, or on a rotary basis about a central point. Such systems all leave defects in connection with the necessary feed of water to the moving machine, or in negotiating soft uneven ground or in dealing with such obstructions as interspersed trees. It is an object of the present invention to provide an improved liquid distribution apparatus which overcomes such problems and provides improved evenness of liquid distribution.

According to one aspect of the present invention, ground treatment apparatus, for example for irrigation purposes, comprises a movable land vehicle constructed and arranged to be steered along a required ground path whilst connected to a supply of treatment fluid via a fluid delivery conduit, the vehicle comprising a steerable carriage having a fluid inlet for connection to the fluid delivery conduit, and having a pair of laterally-extending booms mounted one on each side of the carriage, each boom carrying a plurality of sprinklers, spray nozzles or other fluid distributors to which fluid is supplied from the fluid inlet and which are arranged to deliver fluid material in spray or droplet form onto an area of ground on the corresponding side of the carriage, and each boom also carrying at its tip one or more spray nozzles supplied with fluid material from the fluid inlet and arranged to project a spray of fluid material laterally outwardly (with respect to the direction of forward movement of the vehicle) beyond the outer end of the boom, the overall area of ground onto which fluid is distributed from the vehicle being many times wider than the width of the carriage, and in which the construction, calibration and arrangement of the fluid distributors along the length of each boom and of the tip spray nozzle or nozzles are such that the ground areas covered by the individual fluid distributors overlap one another and that covered by the tip sprayer or sprayers in the direction of the length of the boom in such a way that the total quantity of fluid deposited per unit area of ground on each side of the vehicle in a single forward traverse of the vehicle is uniform throughout a strip of ground extending widthwise from a line located beneath or approximately beneath the path of movement of the inner end of the respective boom to a line extending outside the path of movement of the tip of that boom as viewed in plan.

Each boom may be pivoted to the side of the vehicle about a horizontal axis at its inner end, means being provided for swinging each boom up and down about its pivot.

The vehicle may comprise a chassis and a tower structure supported on the chassis and rotatable about a vertical axis relatively to the chassis, the booms being mounted on the tower structure on opposite sides thereof. Furthermore, means may be provided for angularly oscillating the tower structure together with the booms continuously about the vertical axis of rotation thereof during the advancing movement of the vehicle and during material distribution.

Where the vehicle is self-propelled it may be provided with automatic steering means arranged to cause the vehicle to follow a track defined by a current-bearing buried electric cable, or by a furrow formed in the surface of the ground, or by a rigid or semi-rigid pipe line forming part of the water supply to the vehicle.

For irrigation purposes, the water supply to the vehicle may be arranged in various ways. For instance, the vehicle may have a liquid intake to which is connected one end of a flexible hose the other end of which is connected to a fixed supply outlet. The vehicle is then driven along the required path towards or away from the water supply outlet, within the limits dictated by the length of the flexible hose, after which the far end of the hose is disconnected from that supply outlet and is connected to another supply outlet to supply the vehicle during a further stage of its movement.

The vehicle may be provided with a power driven reel onto which the hose can be wound and from which it can be withdrawn, the reel being preferably constructed and arranged to progressively wind in and store the hose on the reel, and also to pay out the hose behind the vehicle, in each case whilst the hose is filled with water and is conducting water from the supply to the advancing vehicle.

In an alternative arrangement, the water supply to the vehicle is effected through a longitudinally-seamed hose made from flexible strip material whose longitudinal edges have continuous oppositely-facing longitudinal sealing formations which are mutually interengageable, and which, when interengaged, form a sealed seam, the vehicle being provided with a reel on which a supply of the strip material is wound, and a former device through which the strip material drawn from the reel is passed longitudinally and is thereby progressively rolled into tubular form and inter-connected by its edge formations so that the seamed tube is dispensed from the rear of the former as the vehicle advances. The former device may include an open-end tubular probe adapted to enter and extend rearwardly down the interior of the newly-formed seamed tube being dispensed from the former, and to receive water delivered through the seamed hose from a supply to which the rear end of the hose is connected, the probe being connected to the intake of a booster pump mounted on the vehicle which supplies the water at increased pressure to the distribution means.

In another arrangement, the water supply to the vehicle is provided by a longitudinally-seamed water-filled flexible hose lying on the ground and connected to a pressurized water supply, along which hose the vehicle is guided, the hose being formed of a transversely-curled flexible strip material whose longitudinal edges have mutually-cooperating continuous oppositely-facing longitudinal edge formations releasably engaged with one another to form a sealed longitudinal seam, and the vehicle carries a probe device engaged locally with the hose at a zone which advances progressively along the length of the hose as the vehicle advances, the probe being constructed and arranged to create a local separation of the seam edges in the said zone and to draw water through the separation from the interior of the hose, the probe reconnecting the seam edges behind the advancing separation zone, and the probe being connected to the intake of a booster pump on the machine by which the water drawn from the pipe is delivered at increased pressure to the distribution means.

The invention according to another aspect comprises the combination of the specified vehicle, water supply means comprising a longitudinally-seamed pipe of either of the types referred to above with means for drawing water from a progressively-advancing point along the pipe and supplying it to the intake of a booster pump carried by the vehicle, which delivers the water at increased pressure to the distribution means.

Instead of using a pipe to supply water to the advancing vehicle, the installation may include at least one longitudinally-extending open-topped canal filled with water, the vehicle being arranged to move on or over the canal along the length thereof and to draw water from the canal for delivery by the distribution means. The means for drawing water from the canal may comprise a suction pipe or scoop carried by the vehicle and having a mouth shaped and dimensioned so that it approximately fits or occupies substantially the whole of the cross-section of the canal.

Where the vehicle is a wheeled carriage its steering wheels are preferably arranged to run on surfaces of the canal so as to guide the vehicle automatically along the length of the canal. In other arrangements, however, the vehicle may be adapted to float on the water of the canal.

The invention may be carried into practice in various ways, but certain specific embodiments will now be described by way of example only, with reference to the accompanying drawings in which.

Figure 1:
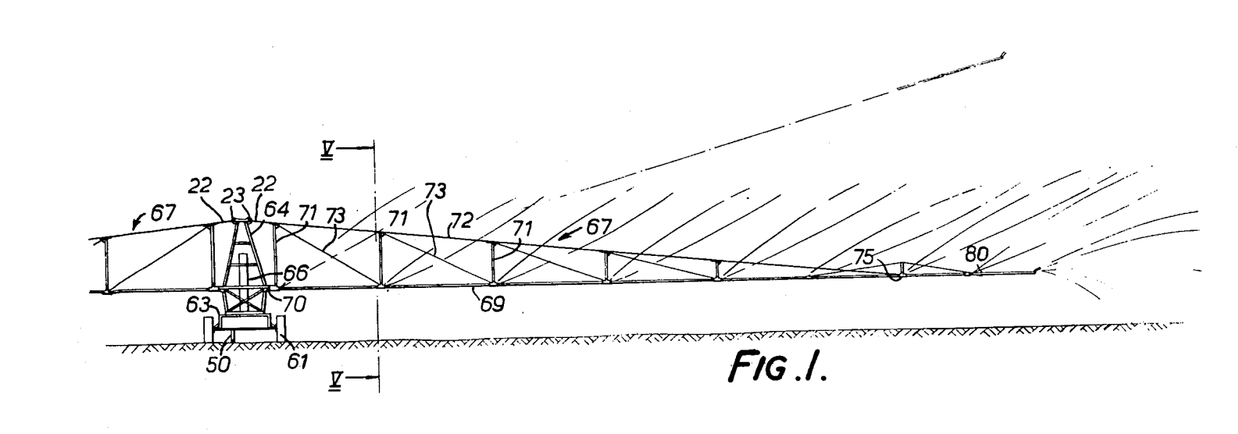
FIG. 1 is a diagrammatic front elevation of a power-driven irrigation machine.
Figure 2:
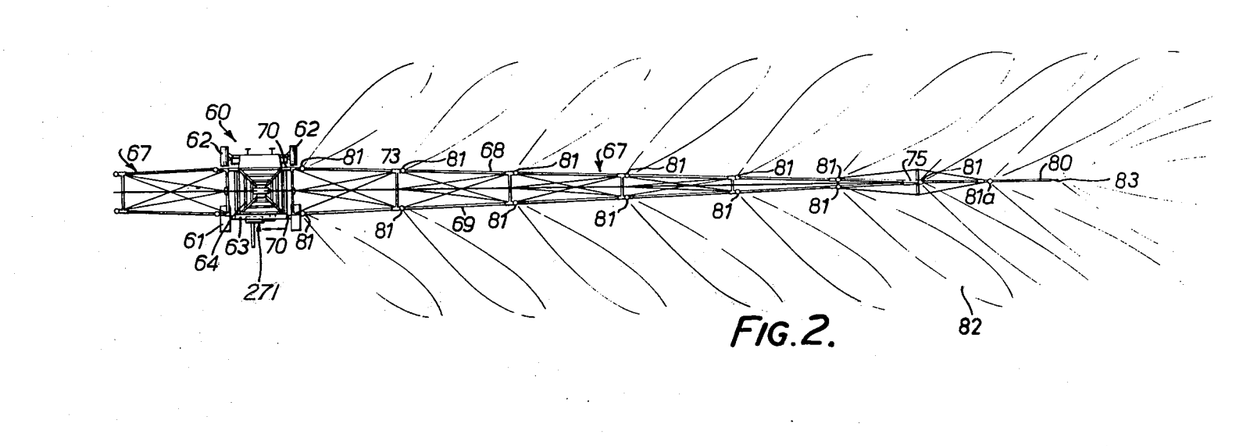
FIG. 2 is a plan of the machine or FIG. 1.
Figure 5:
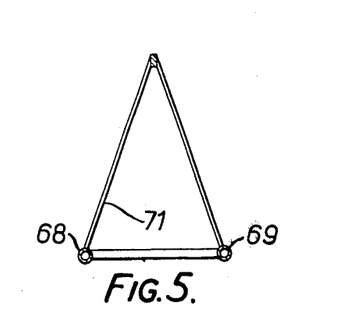
FIG. 5 is a fragmentary cross-section on the line V — V of FIG. 1.

In the embodiment of FIGS. 1, 2 and 5, an irrigation system comprises a movable wheeled carriage 60 which is caused to travel in a predetermined path over an area of ground to be irrigated and delivers water in a controlled spray pattern during its travel, the water being supplied from hydrants distributed over the ground area, to which the machine is successively connected by a flexible hose.

The irrigation machine 60 in self-propelled, being provided with driven rear wheels 61 and nondriven steerable front wheels 62. The rear wheels 61 are driven by a prime mover such as a tractor engine mounted on the chassis 63 of the machine, and the front wheels 62 are provided with a guidance system for automatic steering, which will be described later.

The tower 64 of the machine, which is rotatably mounted on the chassis 63 for rotation about the vertical post 66, carries a pair of elongated booms 67 each of which is of generally triangular cross section as shown in FIG. 5. Thus the lower part of each boom 67 comprises a pair of converging rigid pipes 68 and 69 pivoted at their inner ends to pivots 70 on the side of the tower 64, the pipes 68 and 69 being provided with bracing triangles 71 at intervals along their lengths as shown, and the apices of the bracing triangles being joined by a tensioning cable 72 and appropriate bracing wires 73 to form a stiff lattice-work structure. At their convergent outer ends the leading and trailing pipes 68 and 69 are joined by a fitting 75 which also carries a short extension pipe 80.

The inner end of each boom 67 is pivoted about a horizontal axis pivot at 70 to the tower 64, and a cable 22 is connected to the upper end of the innermost triangle 71 and is led over a pulley 23 at the top of the tower and down through the tower framework to a winch or hydraulic ram (not shown) which enables the whole boom 67 to be swung upwardly from a horizontal or near-horizontal position to a maximum angle of tilt of about 20° to the horizontal. Fixed or rotating sprinkler nozzles 81 are mounted at spaced points along the lengths of the two pipes 68 and 69, and direct feathers of sprayed water outwardly and upwardly in directions inclined to the general length of each boom 67, as indicated at 82 in FIG. 2. In addition a sectoring tip nozzle 83 is mounted on the outer end of the extension pipe 80. The calibration and arrangement of the sprinklers 81 and tip jet 83 are such that their spray patterns overlap to give a substantially uniform water dosage rate over the sprayed strip of ground in a complete pass of the machine. The sprinklers 81 near to the carriage 60 are arranged so as to avoid wetting the ground in the track of the moving machine, it being preferable to keep this ground hard so that the wheels of the machine will not sink in or slip.

The "sectoring" nozzle 83 (which oscillates about a vertical axis) directs a jet or spray of water in the direction of the length of the boom and generally upwardly, i.e. laterally with respect to the path of movement of the machine 60, in a spray of up to 90° cone angle, thereby increasing correspondingly the width of the strip of ground which is sprayed by each boom during the movement of the carriage. The total width of the machine with its booms extended laterally may be about 74 meters, and the tip nozzles 83 have the effect of extending the lateral spraying distance by about 23 meters in each direction beyond the tips of the booms, so that the machine will effectively spray a strip of ground of about 120 meters width. The wheel track of the machine is about 2.5 meters.

The leading and trailing pipes 68 and 69 of each boom provide separate conduits for the supply of water to the sprinklers and tip jet. Thus the leading pipe 68 supplies all the fixed sprinklers 81 mounted on that pipe, whilst the rear pipe 69 provides a separate supply of water to the tip jet 83, and also to the sprinklers 81 which are mounted on that pipe and are of smaller capacity than those on the pipe 68. The inner ends of both pipes 68 and 69 are separately connected to the water supply intake of the machine 60.

Figure 3:
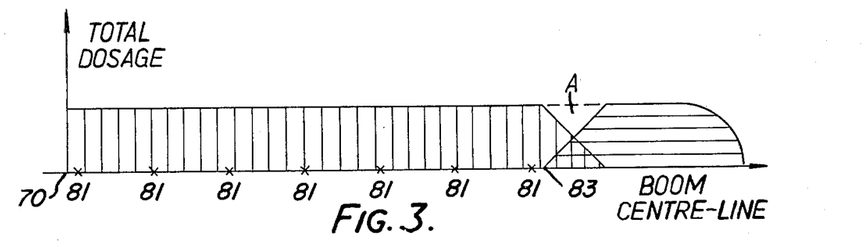
FIG. 3 is a diagram showing the total water dosage distribution along a line at right angles to the direction of travel of the machine.

The sprinklers 81 and 83 are so calibrated and arranged on the booms that their spraying patterns overlay one another as the machine advances, and so that the total water dosage delivered to every unit of ground area in the strip sprayed by the machine in a single pass is approximately uniform. This is indicated diagrammatically in FIG. 3, which is a graph of the total water dosage per unit area, plotted against the boom length. It will be observed that in the region A in FIG. 3 the dosage due to the sprinklers 81 is supplemented by that due to the tip nozzle 83 through the overlapping of their spray patterns, and that as a result approximate uniformity of total distribution is achieved, apart from the narrow path over which the machine passes and onto which spraying is deliberately avoided.

Moreover, means, shown generally at 270, are provided for causing the tower 64 and both booms 67 to oscillate angularly about the vertical pivotal axis 66 of the tower through an angle of about 30°. This oscillation, which is continuous throughout the spraying action of the machine in use, spreads the spraying pattern more widely on both sides of the mean position of the boom, and hence reduces the instantaneous rate of water application per unit area of ground within that pattern, especially in the regions sprayed by the tip jets; and also assists in spreading the spray dosage more uniformly over the sprayed area of ground. The oscillation of the tower and two booms may be produced mechanically by means such as a cyclically-actuated hydraulic ram 271 acting between the chassis 63 and the tower 64.

In the forward direction, water distribution is maintained constant by causing the machine to move forwards at a steady speed, which may be in the region of 16 to 64 meters per hour, and can be adjusted as one means of controlling the water application rate. It should be pointed out that although the instantaneous rate of water application may vary a good deal at any single point from moment to moment as the machine approaches, passes over it and leaves it, nevertheless this is of no account provided that the total amount deposited at each point in the sprayed band during a complete pass of the machine is uniform. The arrangement described enables a very high standard of uniformity of the water dosage to be achieved.

The pivoting of the booms 67 about their pivots 70 enables them to be raised and manoeuvred over small trees and other obstacles during the course of a run of the machine, and moreover the height of their pivots 70 on the tower 64, normally be at least 2 meters above the ground, enables the machine to be used for irrigating tall standing crops such as maize, sorghum, sugar can and bananas.

For transport purposes, the tower 64 is rotated about the post 66 until the booms extend parallel to the fore-and-aft axis of movement of the carriage.

Figure 4:
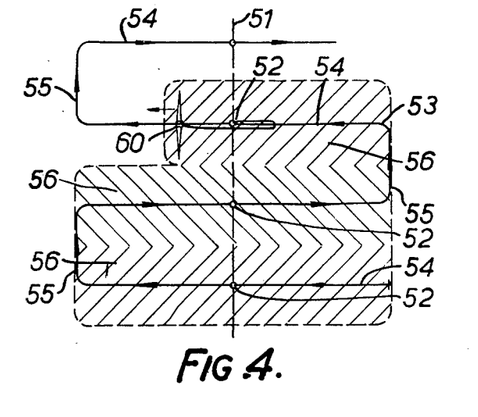
FIG. 4 is a plan on a much smaller scale of an area of ground provided with a water supply system with hydrants, over which the machine of FIGS. 1 and 2 is to move.

The water supply to the machine 60 is obtained via a trailing hosepipe 50 of nylon-reinforced plastic hose, approximately 10 cms in diameter when inflated with water, the length of the hosepipe 50 being for example 200 meters. An economical irrigation system utilising the machine 60 can be provided by installing above ground a main hydrant pipeline of about 15 cms diameter extending at right angles to the proposed directions of spraying movement of the machine, with standpipe hydrants at the points where each main pipeline crosses the centre line of each of the proposed paths along which the machine is to travel for spraying. FIG. 4 shows an arrangement with a single main hydrant pipe 51 provided with hydrants 52 spaced 120 meters apart along the pipe 51. In use the machine 60 is driven along a path 53 which consists of a series of straight parallel tracks 54 each passing through one of the hydrants 52 and joined at their ends by cross-tracks 55, so that the machine travels in opposite directions along the successive tracks 54. In this way each track 54 serves a spraying area as indicated at 56 120 meters wide and 400 meters long. Eight such areas 56 would represent the total capacity of the machine when operated for about twenty hours per day at a low speed, the total area served being then approximately 40 hectares.

Figure 6:
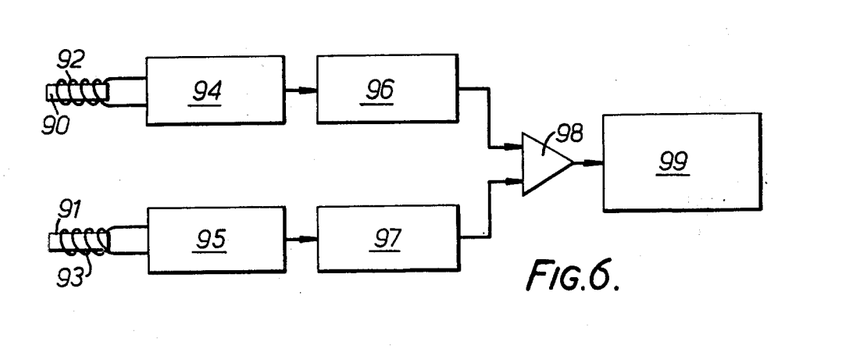
FIG. 6 is a block diagram of an electronic guidance system for automatic steering of the machine along a buried cable.

Since the machine 60 is self-propelled, no towing cable is available to provide steering guidance. FIG. 6 shows an electronic guidance circuit which can be used in conjunction with a buried cable to provide automatic steering of the machine 60 along the length of the cable.

The cable is buried at about 50 cm depth below ground level along the center line of the path which the machine 60 is required to follow. An alternating or fluctuating electrical signal is passed through the cable, and generates a correspondingly alternating magnetic field around the buried cable. Mounted on the front of the machine 60 are a pair of ferrite rods 90, 91 each provided with a pick-up coil 92 or 93. These ferrite aerials are positioned one on either side of the fore-and-aft centre line of the machine, at equal distances therefrom, and serve to pick up the magnetic signal from the buried cable and to induce corresponding electrical signals in their pick-up coils, which are connected to two guidance channels each containing an amplifier 94 or 95 by which the associated signal is amplified, and a detector 96 or 97 which rectifies the signal and supplies it to an input of a common differential amplifier 98. The differential amplifier 98 supplies an output signal corresponding to the difference between the two signals in the guidance channels associated with the rods 90 and 91. Consequently, whenever the machine 60 is symmetrically aligned over the buried cable, the signals picked up by the ferrite rods will be equal and no output signal will be produced by the differential amplifier 98. If the machine veers to right or left with respect to the buried cable, the corresponding one of the ferrite rods will pick up a stronger signal than the other, and an output signal will be produced by the differential amplifier 98, this output signal being either positive or negative depending upon which channel of the guidance signal is dominant. The output signal is supplied to a position servo device 99 arranged to drive steering motors so as to produce a mechanical steering correction which is applied to the steering linkage in the sense tending to reduce the difference signal to zero. Hence the machine is automatically steered along the line of buried cable.

Figure 7:
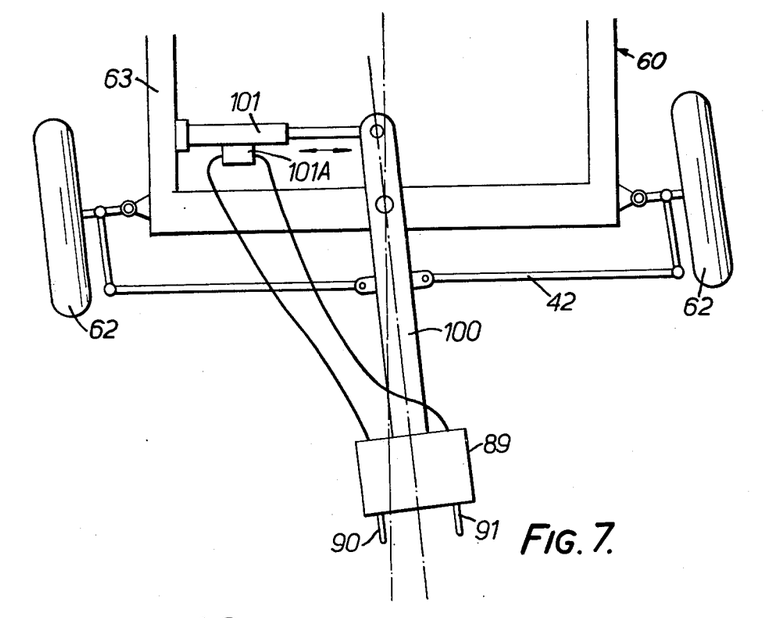
FIG. 7 shows a modified mounting arrangement for the guidance equipment of FIG. 6.

FIG. 7 shows a modification of the electric steering arrangement described with reference to FIG. 6, the modified arrangement being designed to incorporate feedback and to prevent excessive yawing of the machine. For this purpose the machine 60 is provided with a forwardly-extending steering bar 100 coupled mechanically to the Ackermann steering linkage 42 of the carriage, but the outer end of the steering bar is not coupled to any towing cable or other tractive means. A guidance housing 89 which supports the two ferrite aerials 90, 91 and their associated pick-up coils 92, 93 is mounted on the front end of the bar 100, with the aerials 90, 91 symmetrically arranged one on either side of the centre line of the bar 100. A double-acting hydraulic ram 101 having an electro-hydraulic control valve 101A constitutes the steering motor and is controlled by the output of the position servo device 99, the ram 101 acting on the bar 100 to pivot it in one direction or the other. Thus when the machine 60 deviates from the line of the buried cable, the resultant steering correction produced automatically by the electrical guidance system will actuate the steering motor 101 to turn the bar 100 back until the ferrite aerials and the front end of the bar 100 are once again centred over the cable, when the motor will stop, and this will produce a corresponding steering action on the whole vehicle which will trail behind the bar 100 back into alignment with the cable. The system thus provides a servo loop with a position feedback by which the leading end of the bar 100, with the aerials, is controlled to travel along the line of the cable and the bar 100 steers the carriage to follow.

Figures 8, 11, 12, 13:
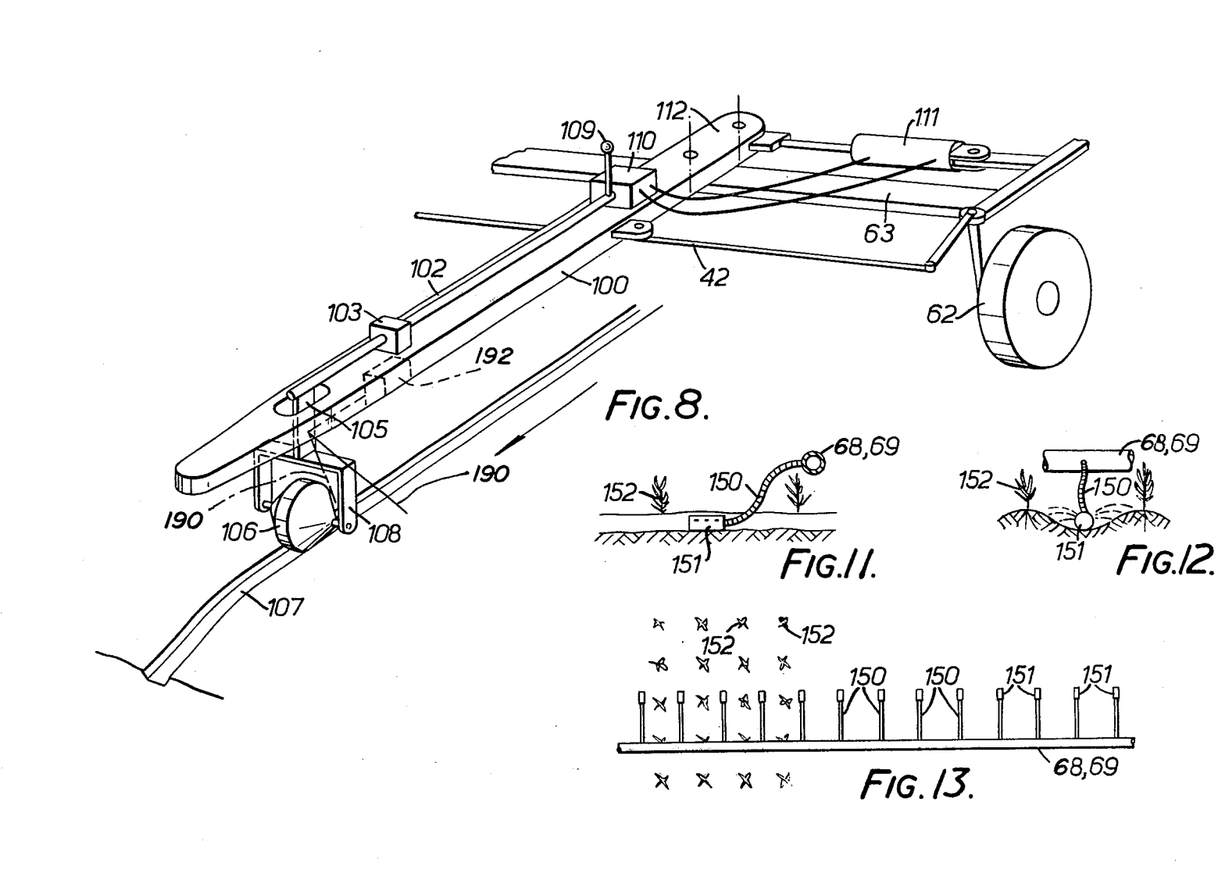
FIG. 8 is a diagram of a mechanically-operated hydraulic system for automatic steering.
FIGS. 11, 12 and 13 show respectively in side and end elevation and in plan, a modified boom arrangement employing trailing hose water distributors.

FIG. 8 shows an equivalent mechanical steering arrangement in which the bar 100 carries a steering rod 102 journalled in a support 103 on top of the drawbar 100 extending parallel to the bar 100. The steering rod carries a downwardly-extending drop arm 105 provided at its lower end with a follower wheel 106 of conical radial section which engages in a furrow 107 ploughed in the surface of the ground. The drop arm 105 extends through an aperture in the bar 100 and has a yoke 108 at its lower end in which the spindle of the follower wheel 106 is journalled. The steering rod 102 is coupled to the operating lever 109 of a hydraulic control valve 110 by which a hydraulic steering motor ram 111 acting on the tail 112 of the bar 100 is controlled. As the machine advances under its own self-propulsion means, the wheel 106 tilts as it follows the line of the soil furrow 107 in which it is engaged, this tilting turning the steering rod 102 about its longitudinal axis in the corresponding angular direction and causing corresponding operation of the hydraulic control valve 110. This energises the hydraulic motor 111 correspondingly in the direction tending to turn the bar 100 until the drop arm 105 is once again vertical and the control valve 110 is restored to its neutral position. This pivoting of the bar 100 produces a corresponding steering correction on the steered front wheels 62 of the vehicle via the steering linkage, so that the vehicle tends to follow the bar 100 back into alignment withh the ploughed furror 107. In this way an automatic steering effect is produced by a system which operates mechanically, but is analogous to the electrical system of FIGS. 6 and 7. A ground feeler yoke device with twin trailing feeler arms 190 may be provided which is connected to a shut-off control 192 for the engine of the machine 60 and acts to stop the machine if the wheel 106 rides out of the furrow 107. The use of a feeler with two interconnected arms 190 prevents the shut-off valve from being actuated by a local irregularity in the ground which affects one feeler only, whilst the wheel 106 is still in the furrow.

Figure 9:
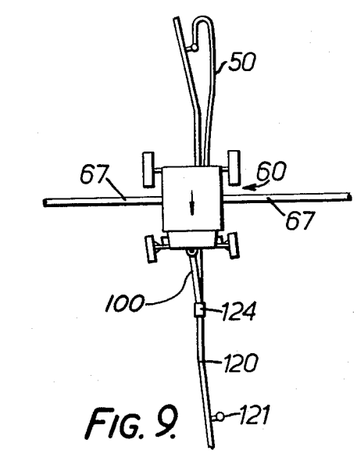
FIG. 9 is a diagram showing how the machine may be guided along a rigid or semi-rigid pipe line.
Figure 10:
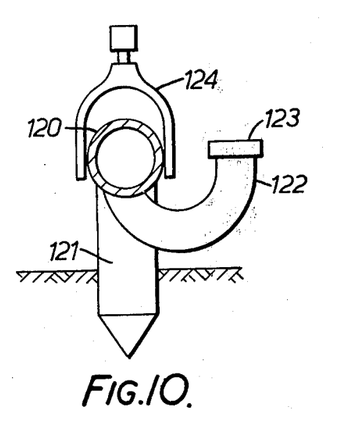
FIG. 10 is a sectional view on a larger scale of the pipe line of FIG. 9, showing the steering slider and a hydrant.

In another arrangement for steering the machine, instead of following a surface furrow ploughed in the ground the machine is made to follow a pipeline which runs down the centre or to one side of the path to be followed. In this case the guidance of the machine is by reference to the pipeline, which will be fixed to the ground so as to be sufficiently rigid for the purpose. FIGS. 9 and 10 show such an arrangement. The pipeline 120 extends longitudinally down the path to be followed, being mounted on stakes 121 forced into the ground. The pipe 120 is provided at intervals along its length with hydrants in the form of U-shaped hose connectors 122, one arm of each of which is secured to the under side of the pipe 120 so as to communicate with its interior, and the other arm carries an upwardly-directed hose coupling member 123 to which the flexible nylon trailing hose 50 is to be connected. A slider 124 mounted directly on the leading end of the steering bar 100 engages over the top of the pipe 120 so as to be able to slide along its length, and to steer the bar 100 and the front wheels of the vehicle 60 accordingly. Again, the slider 124 may take the place of the follower wheel 106 in the arrangement of FIG. 8. One of the advantages of this system is that the guidance by reference to the pipe 120 is more positive than can be provided by a soil furrow, and the path of the machine may be more sharply curved. Furthermore a smaller length of trailing pipe 50 is required, and the hydrants 122 can be at closer intervals along the pipeline, for instance at intervals of 100 meters, so that the flexible hosepipe 50 coupled between the machine 60 and the pipeline 120 serving it need only be 50 meters long instead of 200 meters as in the arrangement of FIG. 4.

Whilst in the arrangements previously described the machine 60 has been provided with laterally-extending booms with sprinkler nozzles or apertures through which the irrigation water is sprayed, FIGS. 11 to 13 show a different arrangement which employs a series of short trailing lengths of hose 150 which are secured at their leading ends to the water conduit pipe 68 or 69 of each boom and have water delivery members in the form of perforated hollow shoes 151 each attached to the downstream end of one of the short hose lengths 150. In use the hose lengths 150 and their delivery shoes 151 are trailed between rows of crops 152 by the booms as the machine is advanced along the length of a strip of land to be irrigated.

A further development of the invention concerns the provision of a power-driven reel for reeling in and dispensing the flexible hose 50 which is used to connect the advancing machine 60 to the fixed hydrants 52 which are distributed about the area of ground to be irrigated. It will be appreciated that when these 200 meter lengths of hose 50 are simply trailed behind the advancing machine throughout the whole of each pass, the heavy water-filled hose has to be dragged along the ground and in so doing severe stresses are set up in the hoses. It is obviously desirable to reduce these dragging stresses if possible, bearing in mind that the total weight of a 200 meter length of flexible pressure hose 10 cms in diameter when filled with water may be about 2 tons. A further difficulty arises from operator resistance to the disagreeable task of picking up and laying down the flexible hosepipe lengths between runs of the machine, and in practice this relaying operation interrupts the irrigation procedure for periods of from between ¾ and 1½ hours. If a 12.5 cm hose is used, its extra weight and water content will increase these difficulties. Moreover it is clearly advantageous to avoid operating with dragging hose lengths if the irrigation machines are to be used for irrigating row crops where no path way through the crop exists.

These difficulties can be avoided by the use of a powered hose reel transported on or with the irrigation machine, on to which the water-filled hose is wound as the distance decreases between the starting point of a run of the machine and the mid-point of the run where a hydrant 52 is situated, and which the pays out the hose as the distance lengthens from the mid-point hydrant to the end of the run. By this means the dragging of the hose is eliminated as is the generation of pull necessary to drag the hose. There is no problem in providing the necessary forward pull for the trailer. In the case of a hose reel mounted on a self-driven irrigation machine, the extra weight would give improved performance in terms of increased available draft before wheel slip occurs.

Figure 14:
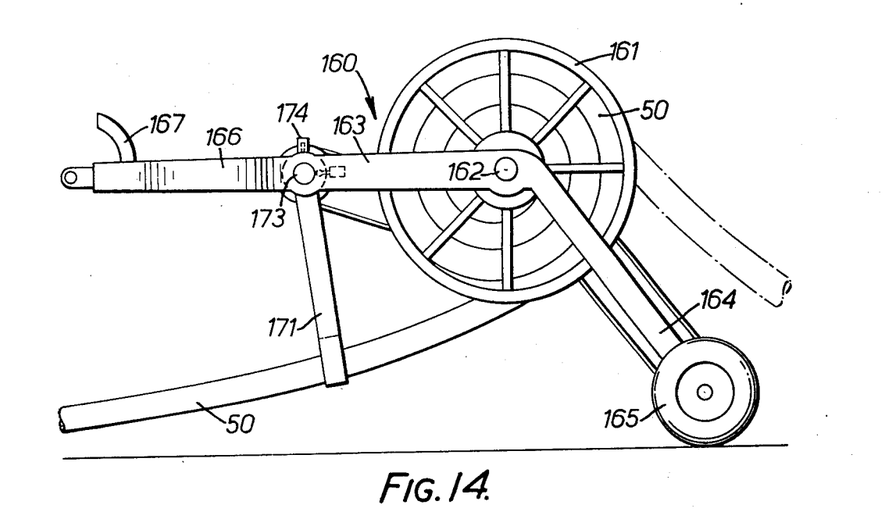
FIGS. 14 and 15 are a side elevation and a plan of a trailer carrying a power-driven hose reel for use with the machine of FIGS. 1 and 2, FIGS. 16 and 17 are elevation and plan views of a hydrant with a swivelling coupling.
Figure 15:
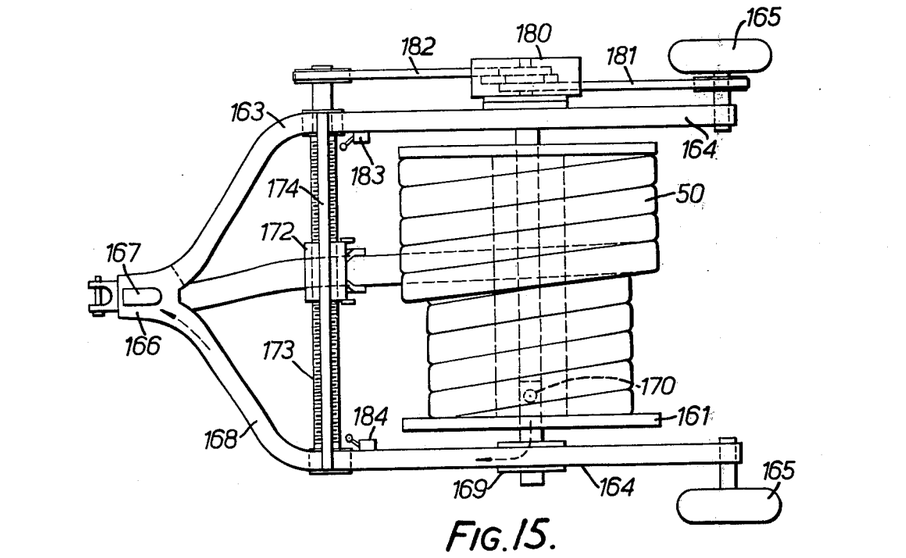

FIGS. 14 and 15 show one form of hose reel trailer unit 160 which can be towed behind the irrigation machine 60. A drum or reel 161, some 2 meters in diameter and up to 2 meters in width and constructed of light steel tube, is mounted on a tubular spindle 162 journalled in a frame 163 having rearwardly inclined legs 164 on which ground wheels 165 are journalled. The trailer has a forwardly-extending drawbar 166 which is forked and provided with a water outlet socket 167 communicating with the interior of one hollow side member 168 of the frame 163. A sealing gland 169 at the bearing provided on this member 168 for the reel spindle 162 provides communication between the bore of the member 168 and the interior of the spindle 162, the latter having an inlet socket 170 to which the inner end of the flexible hose 50 is connected, and which delivers the water content of the hose via the spindle 162, member 168 and outlet 167 to the irrigation machine for spraying.

The 10 cm diameter hose when filled with water under pressure will pack down on the reel 161 in neat layers, the filled hose assuming a near-circular cross section as wound due to the pressure of the water. A guide fork 171 carried by a travelling nut 172 engages the forwardly-extending run of hose being led onto the reel during the wind-up part of the run to feed the hose transversely to its length along the axial length of the reel so as to ensure correct winding in layers. The nut 172 is in threaded engagement with a leadscrew 173 extending between the two arms of the forked frame 163, the nut being also in sliding engagement with a rail 174 which prevents rotation of the nut and hence ensures its axial travel. During this wind-up portion of the run the forwardly-extending hose in engagement with the transport fork 171 is wound underneath the drum as shown in FIG. 14.

The power drive to the hose reel 161 and leadscrew 173 is in this instance through a slipping clutch 180 driven by a chain drive 181 from one of the ground wheels 165 of the trailer. A further chain drive 182 from the clutch drives the leadscrew 173 of the hose transport mechanism. This chain drive 182 is driven through a reversible gear mechanism in the clutch housing. Reversal of the gear mechanism is effected by a solenoid control (not shown) actuated by limit switches 183 and 184 mounted at opposite ends of the leadscrew 173 for operation by the nut 172 at the ends of its travel, so that the reversal of the direction of travel of the nut and of the transport fork are effected automatically, in synchronism with the rotation of the ground wheels 165 and reel 161.

Instead of the solenoid-actuated reverse gear and leadscrew system described, a cam mechanism or an intermittently-engaging chain drive mechanism, in each case driven from the clutch 180, might be employed to engage the transport fork 171 and cause its timed reciprocation, the fork being pivoted at its upper end to a crossbar of the frame 163.

Instead of, or in addition to, the drive from the trailer wheel 165, a power-drive can be provided for the reel 161 by means of a hydraulic motor mounted on the trailer 160 and energised through hydraulic lines connected to a supply of pressure hydraulic fluid on the irrigation machine itself; alternatively a separate auxiliary engine could be mounted on the trailer. Where a hydraulic drive is provided, the trailer could be used on occasion separately from the irrigation machine and in conjunction with a tractor for picking up or dispensing hose, with a choice of driving the reel through the wheels of the trailer or by connection to the standard power take-off on the tractor, or to the hydraulic pressure system which is normally provided as standard equipment on modern tractors.

Figure 16:
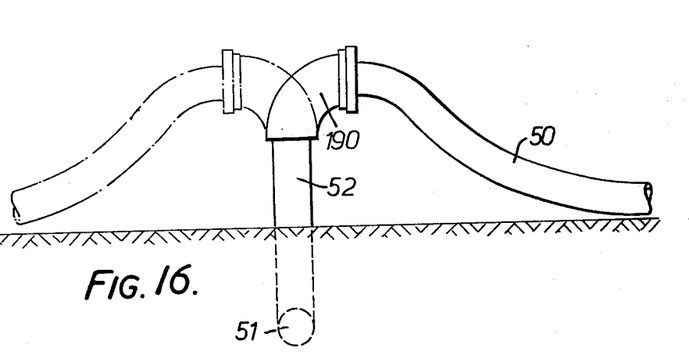
Figure 17:
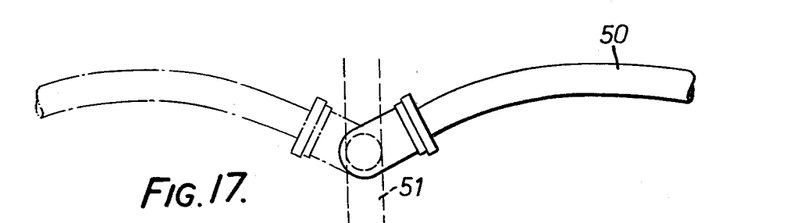

Normally however, the trailer will be coupled to the irrigation machine 60 to be towed behind the latter. To facilitate hose dispensing the irrigation machine is preferably provided with a high-speed forward or reverse gear. To lay out the hose initially, the free end of the reeled hose is coupled to a fixed hydrant at the mid-point of the first pass of the machine, and the machine is then driven back to the starting point of the pass with the reel freed so that the trailing hose is drawn off the reel and is deposited on the ground close to the centre line of the required path. The machine is then driven forwardly in its low working gear to perform the spraying operation, the water supply being delivered through the layed-out hose 50, which is progressively wound onto the reel as the machine advances. On reaching the mid-point hydrant, the drive to the reel 161 slips so that dispensing of the hose 50 can take place thereafter. As the trailer passes the mid-way hydrant 52, the hose connection to the hydrant has to change direction by nearly 180°, and this is accommodated by means of a rotatable 90° bend fitting 190 mounted on the standpipe of the hydrant 52 as shown in FIGS. 16 and 17, the fitting being able to swivel in plan through the necessary angle to allow the hose to be moved from the position extending towards the right, for reeling in, as shown in firm lines in FIGS. 16 and 17, to a position extending towards the left and shown in broken lines for paying out from the reel. The hydrant 52 is preferably offset about 1 metre to one side of the path of the machine so that it can be ensured that the hydrant head 190 turns freely through nearly 180° as the machine passes, and thereby kinking of the hose is avoided. The rotatable coupling 190 is, of course, suitably sealed to the vertical standpipe 52.

During the second part of the run of the machine forwardly from the mid-way hydrant 52, the line of the hose 50 moves from its reeling-in position underneath the reel 161, to the paying-out position leading from the top of the reel as shown in broken lines in FIG. 14. In doing so the hose 50 moves out of the control of the transport fork 171, which is not needed for the paying-out operation during the second part of the run.

At the end of the first pass, the extended trailing hose 50 is disconnected from the hydrant and is reeled in by power operation of the reel 161. The machine is then driven to the standpipe at the mid-point of the next strip of ground to be irrigated, and its end is coupled to the hydrant. With the reel released the machine is then driven back to the starting point of the next run, so that the empty hose is laid out ahead of the machine, the water supply is turned on to fill the hose, and the next irrigation pass of the machine is then performed. It will be seen that the use of the powered reel 161 enables the hose 50 to be laid out and to be picked up entirely mechanically, and saves all manual handling of the hose as well as avoiding any necessity for the filled hose to be dragged along the ground.

In practice it may be found that the hose 50 will normally pack in a near-circular but slightly squared sectional form on the reel 161, due to the internal water pressure. Thus the effective diameter of the hose for reeling in is slightly less then its nominal full diameter. A 10 cm hose 200 meters long can thus be accommodated on a reel having an effective winding diameter of about 2 meters, and having an axial length of about 1.8 meters, in about two complete wound layers of the filled hose. Alternatively, a drum of the same reeling diameter but only 1.2 meters long would store the same length of hose in four layers giving a potential drum capacity of nearly 300 meters hose length. The same size of drum could accommodate about 250 meters of 12.5 cm hose, in four layers, and a practical diameter for such a drum would be about 3 meters overall. This is a possible common size of drum to accommodate both sizes of hose, leaving some capacity to spare.

A limiting factor in the irrigation capacity of an installation such as that of FIG. 4, using a machine 60 with trailing flexible hoses 50 with or without the powered hose reels 161, is the pressure drop in the hose 50. To overcome this difficulty, a large-diameter flexible hose which supplies the moving machine but does not have to be moved or reeled whilst filled is required. It need not be operated at high pressure, because the pressure can be boosted if need be at the receiving point on the moving machine.

FIGS. 18 to 22 shown an arrangement which enables this requirement to be achieved, by the use of a large-diameter (e.g. 22.5 cm diameter) flexible hose which is formed from a flat strip or ribbon 200 of flexible material having cooperating longitudinal mouldings 201, 202 along both its longitudinal edges enabling the strip to be rolled up longitudinally and the mouldings secured together to form a longitudinally-seamed pipe. A length of the flat strip material with its edge mouldings is wound on a reel 203 mounted on the machine 60 and is paid out behind the machine, being passed through a former device 205 carried by the machine 60 behind its rear end, the device 205 progressively rolling the strip into tube form and progressively joining the edge mouldings 201, 202 together in a manner analogous to that of a zip fastener, to form the strip into a seamed tube 212 passes through and emerges from the former device 205.

Figure 18:
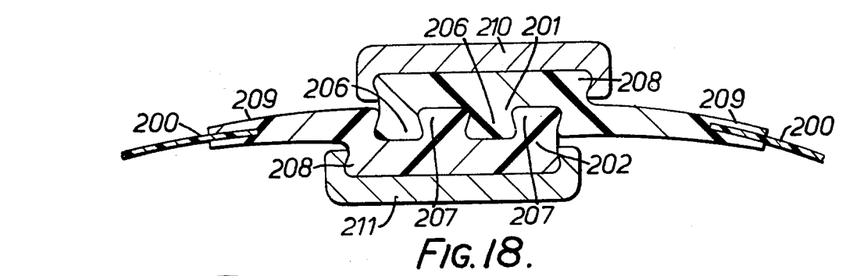
FIG. 18 is a cross-section of the moulded edges of a strip for forming a seamed hose pipe.
Figure 19:
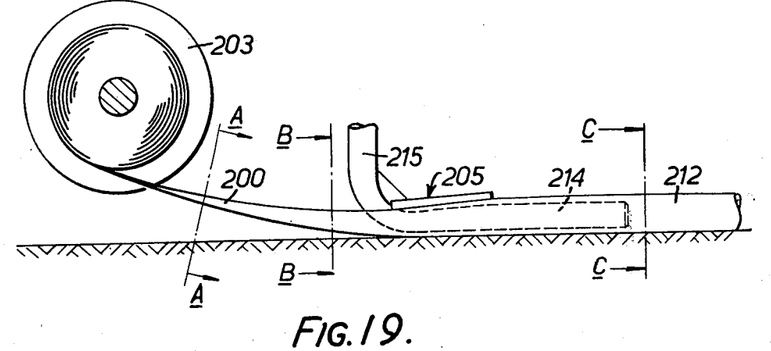
FIGS. 19 and 20 are elevation and plan views of an attachment for the machine of FIGS. 1 and 2 for forming and laying a seamed pipe behind the machine.
Figure 20:
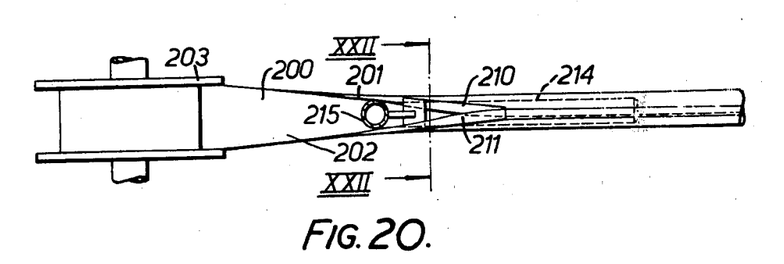
Figure 21A:
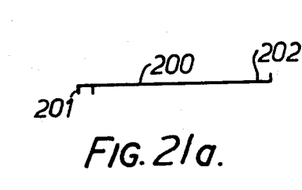
FIGS. 21a, 21b and 21c show the cross-section of the flexible strip at points A—A, B—B and C—C respectively in FIGS. 19.
Figure 21B:
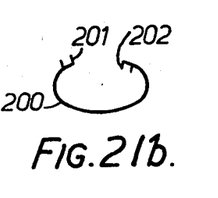
Figure 21C:
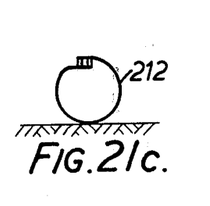
Figure 22:
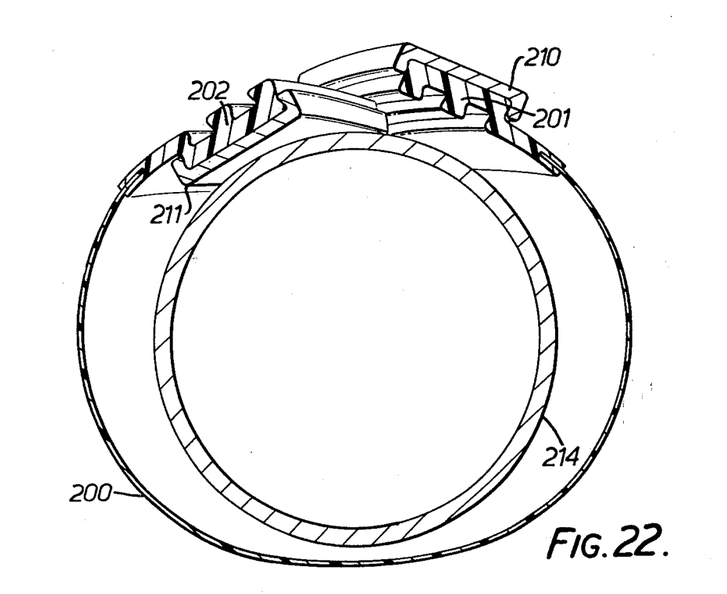
FIG. 22 is an enlarged cross-section on the line XXII — XXII of FIG. 20.

As shown in FIG. 18, the edge mouldings 201, 202 are moulded by extrusion of a hard but resilient plastics material, for example a synthetic rubber, with a mesh or fabric reinforcement if necessary, and are formed with cooperating opposed longitudinal ribs and grooves 206 and 207 which can be interengaged with one another with an interference fit, or even with a positive interlock (released by flexing the backs of the mouldings 201, 202) to form the required longitudinal seam. The backs of the mouldings are formed with longitudinal protruberances 208 which are undercut at their edges for positive engagement by the former device 205, and the mouldings also have flanges 209 in which the edges of the flexible strip 200 are embedded. The flexible strip 200 may be a fabric of longitudinal and transverse tension fibres impregnated with a thermosetting synthetic resin material which is flexible when cured. In a 22.5 cm hose, the mechanical hoop tension to be withstood per inch of pipe length and per 10 p.s.i. of internal pressure would be 45 lbs.

The former device 205 comprises a pair of channel-section guide tracks 210, 211 whose channels are oppositely-facing and whose flanges are internally undercut, so that each can grip positively the protruding undercut protruberance 208 of one of the strip edge mouldings 201 or 202. These guide tracks converge into overlapping relationship as shown, and are so arranged that as the strip 200 is drawn lengthwise through the device 205 with the edge mouldings 201, 202 engaged in the guide tracks 210, 211, the latter draw the edge mouldings into overlapping relationship and force them positively into engagement to form a locked seam before the strip, now curled the form of a tube 212, leaves the device 205. If necessary, the guide tracks 210, 211 also flex the mouldings backwardly to enable their cooperating ribs and grooves to become interengaged.

The former device 205 also incorporates a tubular probe 214 having a curved outlet end 215. The probe 214 extends rearwardly a substantial distance beyond the rear ends of the guide tracks 210, 211 within the newly-formed seamed tube 212, and is open at its rear end around which the tube 212 is a close sliding fit. The probe 214 is rigidly secured to the two guide tracks 210, 211 and is supported by means of a rearwardly-extending bracket (not shown) on the irrigation machine 60, and its upswept outlet end 215 passes between the inturning edges of the strip 200 and is connected to the suction inlet of a booster pump mounted on the machine 60, the pump being driven by the propulsion engine of the machine itself in the case of the self-propelled machine 60.

In use, the end of the strip 200 coiled on the drum 203 is fed through the former device 205 and is connected to a hydrant at the start of a run of the machine 60, with the machine standing close to the hydrant. The water supply is turned on, and the machine is started into movement along the required track. As the machine advances, with the drum 203 free, the strip is progressively paid out from the drum and fed through the former 205, to form a seamed tube 212 which is progressively laid along the ground behind the advancing machine. The water supply is delivered from the hydrant through the newly-formed tube to the open rear end of the probe 214, into which it is drawn by the suction of the booster pump. The water drawn into the probe 214 passes via its upswept outlet 215 to the inlet of the booster pump which delivers it at increased pressure to the boom sprinklers and tip nozzles, or other distribution devices.

Since the water pressure in the newly-formed pipe 212 is low, for instance 15 p.s.i. at inlet, leakage at the seam will be low, not exceeding 1 gallon per minute per 100 feet of hose, and a certain amount of leakage at the former device can be tolerated, not exceeding say 1 gallon per minute at the maximum operating pressure. All available water delivered at the low pressure to the region of the mouth of the probe 205 will be swept up by the pump suction applied to the probe. The delivery pressure of the booster pump may be 60 p.s.i.

When the machine 60 reaches the end of its run, the water supply is turned off at the hydrant and the hose end disconnected, and then the drum 203 is power-driven in the winding direction to wind back the strip 200, drawing the empty hose 212 over the ground and through the former device which progressively releases the seam joint between the mouldings 201, 202 and uncurls the hose to flat strip form.

The arrangement of FIGS. 18 to 22 is convenient for field operation in that it obviates the operations of laying down pipe and trailing the filled pipe. This advantage is partly offset by the need for picking up the pipe at the end of each run, but the winder equipment for performing this operation mechanically is provided on the irrigation machine.

Figure 23:
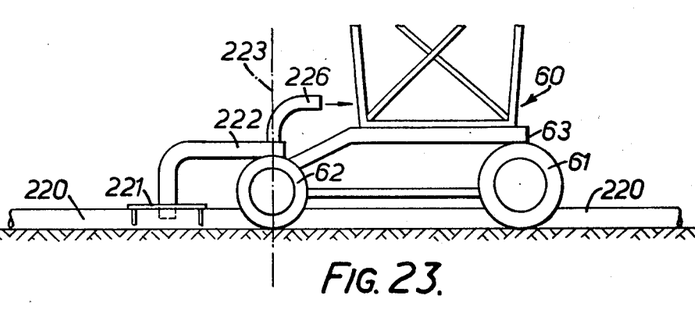
FIG. 23 is a side elevation, in diagrammatic form, of a machine with a follower device for steering the machine along a seamed pipe laid on the ground, and for drawing water from a progressively-advancing opening in the seam formed by the follower device.
Figure 24:
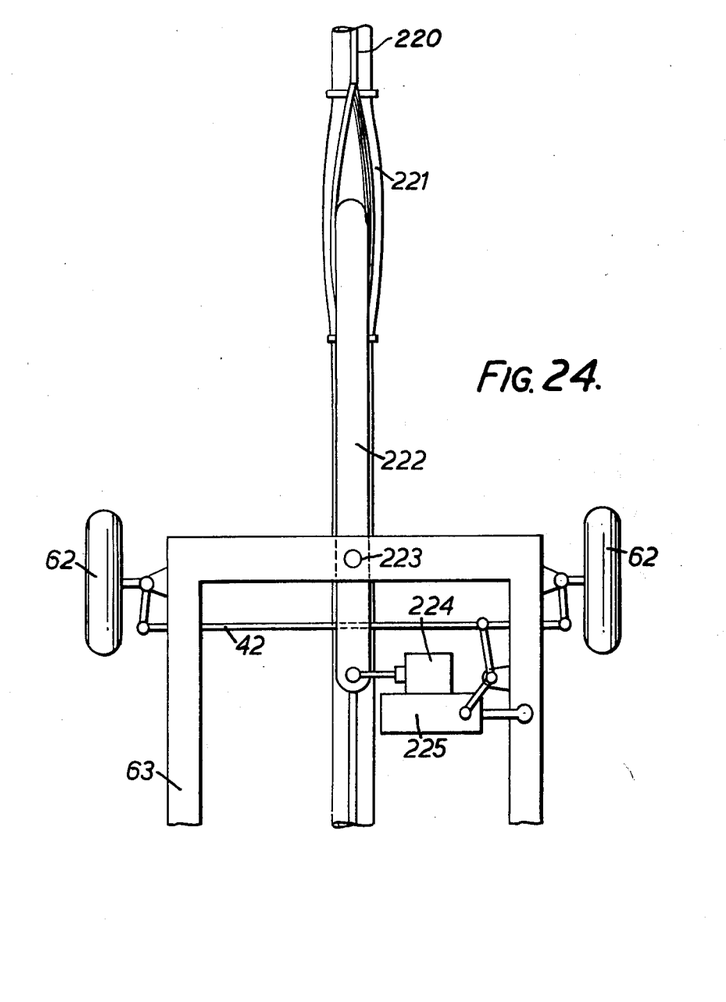
FIG. 24 shows diagrammatically in plan how the follower device and pivoted probe of FIG. 23 are coupled to the steering of the machine.
Figure 25:
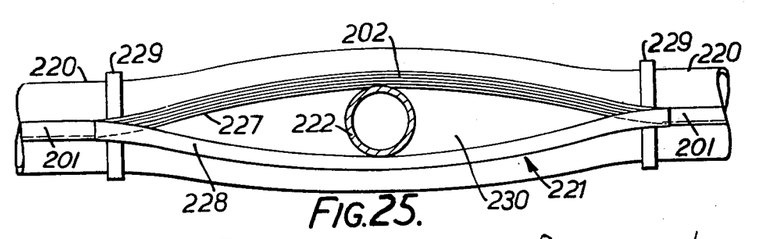
FIG. 25 is a plan on a larger scale of the follower device of FIG. 23.

Another arrangement employing zip-up seamed pipe is illustrated in FIGS. 23 to 25. In this case a large-diameter seamed hosepipe 220, formed of flexible strip with edge mouldings 201, 202, is laid down on the ground along the required path of the machine 60 during a run, and is connected to a water supply to fill the pipe, and the filled pipe is used as a reference to guide the steering of the machine to follow the length of the pipe. A guide collar device 221 surrounds the pipe 220 and is carried by a forwardly-extending tubular probe 222 pivoted near its rear end about a vertical swivelling axis 223 to the machine 60. The probe actuates the control valve 224 (FIGS. 24) of a hydraulic steering ram 225 coupled to the steering linkage 42 of the machine in a manner providing a positional feedback, somewhat similar to the arrangement of FIG. 8, so that the guide collar 221 as it follows the pipe 220 operates an automatic steering control of the vehicle causing it to follow the length of the pipe. The collar 221 also incorporates a double-zip device which progressively unfastens the seam joint between the mouldings 201, 202 to allow the probe 222 access to the interior of the pipe 220, and then reconnects the seam beyond the probe, as the collar slides along the length of the pipe. A booster pump (not shown) mounted on the moving machine 60 has its inlet connected by a pipe 226 to the downstream end of the probe so that the upstream end of the probe draws out water from the interior of the pipe 220 through the opened-up (de-zipped) portion of the seam.

The collar 221 comprises a pair of opposed channel-section guide tracks 227, 228 which diverge from an overlapping position at the front end of the collar, pass one on either side of the downswept end of the probe 222, and then converge again to an overlapping position at the rear end of the collar. At their overlapping ends the guide tracks are secured to rings 229 which slidably surround the seamed pipe 220. Thus as the collar 221 is advanced along the pipe 220, with the guide tracks in slidable engagement with the protuberant backs of the mouldings 201, 202, the seam is first progressively unzipped in front of the probe and then reconnected behind it. The space between the separated portions of the guide tracks 227 and 228 is closed by a plate 230 sealed around the probe 222.

Figure 26:
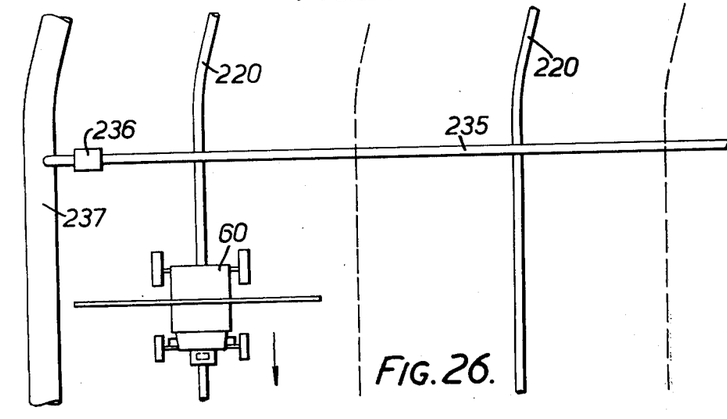
FIG. 26 is a plan of an area of ground provided with laid seamed pipes for supplying a machine having a follower attachment according to FIGS. 23 to 25.

FIG. 26 shows a typical installation using this form of water supply to the machine 60. Seamed hoses 220 are laid on the ground at suitable spacings, say 120 meters, along the centre lines of adjacent required runs of the machine, and are all connected to a feeder main 235 connected to the outlet of a low-pressure pump 236 which draws water from a stream, canal or other source 237 and supplies it at say 15 p.s.i. to the feeder main and seamed pipes. The machine 60 is driven along each pipe 220 in turn with the collar 221 engaged with and following the pipe to steer the machine, and draws water from the unzipped portion of the seam within the collar. The water is delivered by the booster pump at 60 p.s.i. to the boom sprinklers and jets for distribution of the strip of ground on either side of the pipe 220.

This arrangement has the advantage that the seamed pipe can be laid on the ground and can remain in position semi-permanently, and themselves provide the necessary references for automatic steering of the machine 60. Moreover, once again, the pipes 220 can be of larger diameter than could be handled conveniently when full. Each of the seamed pipes 220 could be say 22.5 cm in diameter and up to 650 meters long, and with a pressure drop of only 7 p.s.i. per 325 meters could supply a 300 acre strip of ground. The arrangement thus provides an economical water supply distribution system for a large area, operating at 15 p.s.i. in the distribution hoses in combination with a pressure booster pump on each machine.

Figure 27:
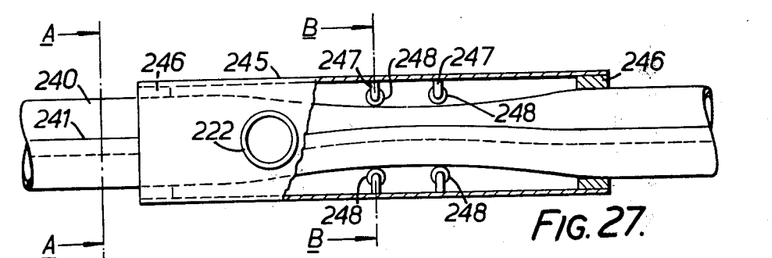
FIG. 27 is a plan of a modified form of follower device.
Figure 28:
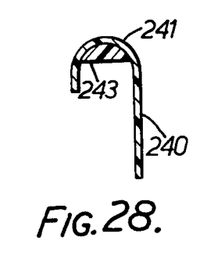
FIG. 28 is an enlarged fragmentary view of one edge of a resilient strip for forming into a second pipe by means of the device of FIG. 27, FIGS. 29a and 29b are diagrams showing the crossection of the seamed pipe at the lines A—A, and B—B, in FIG. 27.
Figure 29A:
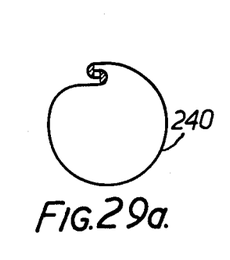

FIGS. 27 to 29 show a modified form of seamed pipe and a modified form of follower collar which can be used in an arrangement similar to that of FIGS. 23 to 25. In this case the seamed pipe 240 is made of a hard, springy plastics strip material, for example that sold under the trade name VYBAK, having preformed curled-over edge formations 241, 242 on its longitudinal edges, as shown in section in FIG. 28, which hook together as shown in FIG. 29a to form the seam joint of the hose and are held in engagement by the resilience of the strip material aided by the internal water pressure. A resilient sealing strip 243 is located in one or each edge formation for sealing engagement with the extreme edge of the other formation.

Figure 29B:
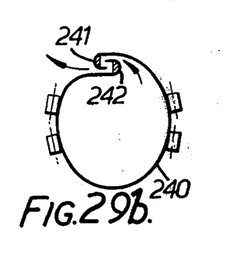

The collar comprises a tubular sleeve 245 surrounding the pipe 240 and provided with annular seals 246 at each end which engage with the exterior of the pipe. Journalled on brackets 247 in the interior of the sleeve are pairs of pressure rollers 248 which engage the exterior of the pipe within the sleeve on either side of the seam and press the pipe walls inwardly, i.e. together, thus locally disconnecting the seam to create a leak (see FIG. 29b) through which water is drawn by the suction of the booster pump acting via the probe 222. This arrangement relies on the resilience of the plastics strip material, aided by the internal water pressure, to ensure that the seam is re-established before the pipe leaves the sleeve.

It will be understood that the various seamed hose and zip-follower devices of FIGS. 18 to 29 may be used for many fluid supply and distribution purposes other than in connection with irrigation machines such as the machine 60.

Figure 30:
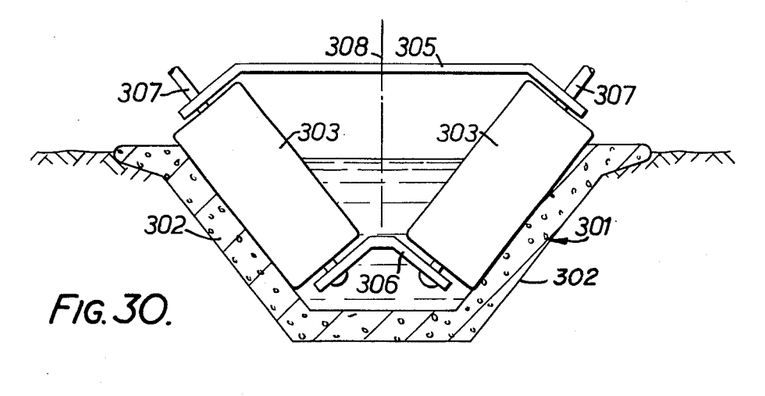
FIG. 30 is a cross-section of a water supply canal showing the driving rollers of an irrigation machine following the canal.
Figure 31:
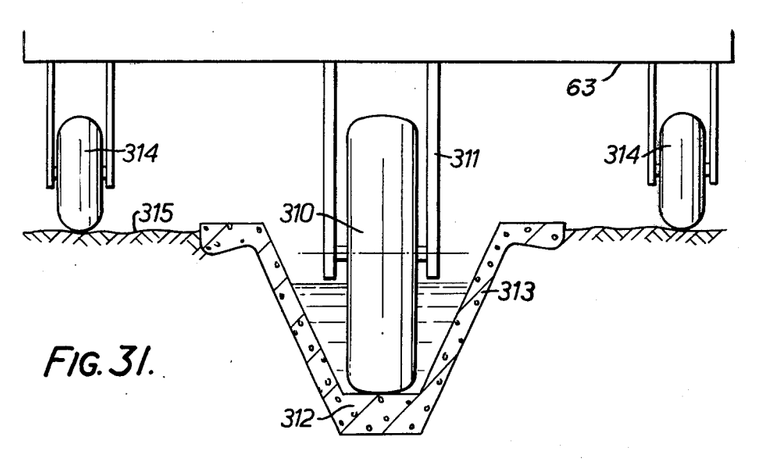
FIGS. 31 and 32 are views similar to FIG. 30 of modified canal arrangements.
Figure 32:
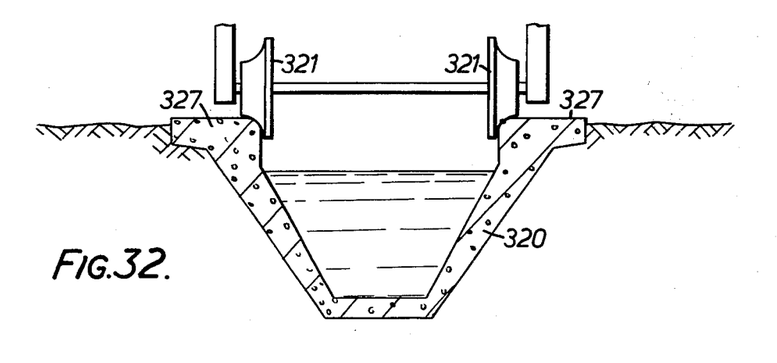

Other arrangements for obtaining the water supply to the machine 60 without involving the use of a supply pipeline of flexible hose, are shown in FIGS. 30, 31 and 32, and involve the use of concrete canals of regular cross-section having an open top and side walls which slope generally outwardly from the bottom. These canals may be formed either as prefabricated sections of metal or concrete which are assembled together on site, or may be formed in situ of concrete by a continuous casting process, preferably employing reinforcing wires which are inserted where required, especially in the base of the canal section. The arrangement of such canals in plan or cross-section has to take account of the configuration of the ground, and would be ideally arranged so that all parts of the area of ground to be irrigated can be sprayed in a single pass of the machine 60 as it progresses along the length of the canal from one end to the other, or as it passes around a canal formed in the shape of a closed loop. In such arrangement the propulsion of the machine can be obtained by the use of a motor or engine mounted on the machine and driving carriage wheels or rollers which engage the canal in some way. Thus in FIG. 30 there is shown a cross-section of a cast concrete canal 301 having outwardly sloping side walls 302 whose inclination to the horizontal is approximately 45°, and having a flat bottom wall. The chassis 63 of the machine 60 carries a pair of supporting and driving rollers 303 which are journalled in supports 305 and 306 on the machine with their driving shafts 307 correspondingly inclined outwardly and coupled by means not shown to the prime mover on the machine. These outwardly-inclined rollers 303 engage against the inner surfaces of the sloping side walls 302 of the canal section so as to support the machine and also to drive it along the length of the canal, the rollers dipping into the water in the canal. The whole assembly of the two rollers 303 and the upper and lower supports 305 and 306 constitutes a steering bogie which is pivoted to the chassis of the machine about a vertical pivotal axis 308 and steers the machine automatically along the canal without the need for further guidance control.

FIG. 31 shows another arrangement in which the chassis of the machine has a main propulsion wheel 310 journalled in supports 311 and running along the flat bottom 312 of the canal shown in section at 313. In addition the machine has a pair of subsidiary wheels 314 attached to the chassis 63 and running along the ground 315 on each side of the main wheel 310 and canal 313.

FIG. 32 shows a third arrangement in which the top inner edges of the sides of the canal 320 are used as rails along which run pairs of flanged supporting/steering wheels 321 of the machine. Alternatively metal rails might be mounted on the top lip portions 327 of the concrete canal 320 to support the rails 327.

In all these cases in which an irrigation machine moves along a canal, and possibly also floats on the water on the canal, the motor used for tractive purposes for the machine may also be used for pumping up water from the canal via a suction pipe or scoop, and forcing the water under pressure through the sprinklers and jets of the booms, or other distribution means. In certain instances the mouth of the suction pipe or scoop is shaped and dimensioned so that it approximately fits or occupies the entire submerged cross-section of the canal and sucks up all or most of the water reaching it as the machine advances, leaving the canal substantially empty on the other side of the scoop. The scoop may face forwardly or rearwardly, depending upon the direction of the water supply along the canal.

It will be appreciated that, broadly speaking, the invention provides a land treatment installation in which a vehicle is guided, preferably automatically, along a supporting path way extending along the length of the area to be treated, water or other liquid material being supplied, preferably substantially continuously, to the vehicle, and the vehicle having liquid distribution means enabling it to distribute the treatment material approximately evenly on one or both sides of the path way to a distance which is much greater, e.g. at least 10 times and preferably 20, 30, 40, 50 or even 100 or more times the width of the path way required to support the vehicle, the vehicle only interacting with the ground or other supporting surface inside the confines of the path way. The path way need only be narrow e.g. 2 to 5 meters wide, in order to support the vehicle which may be 1.5 to 3 meters wide for irrigating an area 120 meters wide with the twin boom arrangement described above.

It is also possible to dispense with the booms of the machine 60 etc. altogether, and to provide the required degree of lateral spread of the sprayed water on each side of the main carriage by the use of suitable jets directed from rain guns mounted on the carriage.

The apparatus could also be used to supply liquid or powder nutrients or medicaments such as insecticides, herbicides or fungicides to a crop, and thus although the invention has been described principally with reference to irrigation, it is to be appreciated that the apparatus can be used to distribute these other fluid materials as well. Chemicals can be metered directly into the water supply, or the machine could carry a supply of the chemical and meter it into the water being distributed through the booms on the machine.

What I claim as my invention and desire to secure by Letters Patent is:

1. A land irrigation machine which comprises a self-propelled steerable vehicle which can be driven and steered in a direction of forward movement along a required path on the ground while connected to a supply of water through a flexible hosepipe, the vehicle comprising
   a. a steerable carriage having a water inlet for connection to the hosepipe,
   b. a generally horizontal elongated boom structure pivotally mounted on the carriage, said boom structure comprising two elongated sprinkler arms which are disposed transversely to the direction of forward movement of the vehicle and extend respectively on opposite sides of the carriage over a distance several times greater than the width of the carriage, each of said arms carrying a plurality of fixed water sprinklers distributed along the length of the arm, each of said sprinklers being connected to be supplied with water from the water inlet and to deliver the water in droplet form onto the ground in respective areas which overlap one another,
   c. means for pivotally mounting said arms for oscillation in alignment with each other about a vertical pivot axis, and
   d. means for decreasing the rate at which the water from said water inlet is distributed to the ground without decreasing the volume of water being supplied to each segment of the ground, said means including power means for continuously oscillating said arms about said vertical pivot axis while water is being delivered through said water sprinklers onto the ground alongside the vehicle during the forward movement of the vehicle along said path.

2. A land irrigation machine as claimed in claim 1 wherein said boom structure includes a central tower pivotally mounted on the carriage for rotation about said vertical pivot axis, said sprinklers arms being attached at their inner ends to the tower on opposite sides thereof, and
   wherein said power means for oscillating said arms acts directly between the said carriage and said tower to cause angular oscillation of said tower and said two sprinkler arms carried thereby.

3. A land irrigation machine as recited in claim 2 further comprising means for pivotally mounting each of said arms about a horizontal axis on said tower transverse to the axis of said arms, and means for adjusting the angular inclination of each of said arms with respect to the ground by pivoting each of said arms about said horizontal axis.

4. A land irrigation machine as claimed in claim 1 wherein said carriage is a wheeled carriage with steerable wheels, and wherein said machine further includes an automatic power steering mechanism arranged to steer the vehicle along an elongated guide formation, at the surface of the ground, said steering mechanism including a follower arranged to engage and follow said guide formation, said follower constituting a sensor responsive to the engagement of said follower with either side of said guide formation, a servo mechanism responsive to signals from the follower, and a steering motor acting on said steerable wheels under the control of said servo mechanism to steer said vehicle along the line of the guide formation and retain said follower in engagement therewith as said vehicle advances.

5. A land irrigation machine as claimed in claim 4 further comprising a forwardly-extending steering arm pivoted about a vertical axis to the carriage and coupled to said steerable wheels so that angular movement of said steering arm about its pivot produces a corresponding steering movement of said steerable wheels, hydraulic motor means constituting said steering motor and acting on said steering arm under the control of a hydraulic control valve, a drop arm pivotally mounted at the leading end of said steering arm for tilting movement about a horizontal axis through its upper end parallel to the length of said steering arm, said follower member being mounted on the foot of drop arm for engagement in a soil furrow constituting the guide formation, and a mechanical connection between said tiltable drop arm and said hydraulic control valve, whereby a divergence of the leading end of the steering arm in either direction from a position immediately above the line of the furrow is sensed by follower engaged between the side walls of the furrow and tilts drop arm, thereby actuating control valve to cause hydraulic motor to impose a corresponding steering correction movement on steering arm and thereby also restoring drop arm to its upright position and restoring control valve to its neutral position.

6. Apparatus as claimed in claim 5 including feeler means carried by the steering arm and constructed and arranged to contact the ground surface, the feeler means being connected to shut-off means for stopping the forward movement of the vehicle and being arranged to sense a change in the height of the steering arm above ground surface level caused by the follower member riding out of the furrow, and to actuate the shut-off means in response to the said change in height.

7. A land irrigation machine as claimed in claim 5 in which the follower member comprises a wheel whose radial section is frusto-conical, said wheel being journalled on the foot of said drop arm.

8. A land irrigation machine as claimed in claim 1 in which the vehicle is provided with a power-driven reel on which the hose can be wound and from which it can be withdrawn.

9. A land irrigation machine as claimed in claim 8 wherein the hose is collapsible to flattened form when empty and is constructed and arranged to be inflated to circular cross-section by internal water pressure, and wherein the reel is constructed and arranged to progressively wind in and store the inflated hose on the reel, and also to pay out the inflated hose behind the vehicle, in each case while the hose is conducting pressurized water from the supply to the advancing vehicle and is inflated by the pressure of the said water.

10. A land irrigation machine as claimed in claim 1 which each of said sprinkler arms carries at its outer end a spray nozzle which is directed outwardly and upwardly with respect to the length of the arm and is arranged to project a spray of water outwardly beyond the outer end of the arm.

* * * * *